United States Patent [19]
Kosaka et al.

[11] 3,922,473
[45] *Nov. 25, 1975

[54] LAMINATED FILM

[75] Inventors: Yujiro Kosaka; Masaru Uemura; Tokio Fujiki; Mitsutaka Saito, all of Shin Nanyo, Japan

[73] Assignee: Toyo Soda Manufacturing Co., Ltd., Yamaguchi, Japan

[ * ] Notice: The portion of the term of this patent subsequent to July 31, 1990, has been disclaimed.

[22] Filed: Oct. 2, 1973

[21] Appl. No.: 402,916

[30] Foreign Application Priority Data
Oct. 11, 1972 Japan.................. 47-101123

[52] U.S. Cl............. 428/463; 156/332; 260/878 R; 260/886; 427/407; 427/409; 427/411; 428/474; 428/483; 428/514; 428/518; 428/910
[51] Int. Cl.$^2$..................... C09J 3/14; B32B 27/30
[58] Field of Search....... 117/76 F, 76 P, 75, 122 H; 156/332; 161/256, 251, 218; 427/407, 409, 411; 428/463, 474, 483, 514, 518, 910

[56] References Cited
UNITED STATES PATENTS

| | | | |
|---|---|---|---|
| 3,215,678 | 11/1965 | Adelman.......................... | 156/332 X |
| 3,483,023 | 12/1969 | Dotson et al................... | 117/122 H |
| 3,663,334 | 5/1972 | Mueller-Tamm et al....... | 156/332 X |
| 3,669,797 | 6/1972 | Fukazawa et al............... | 156/332 X |
| 3,671,356 | 6/1972 | Keinanen...................... | 156/332 X |
| 3,697,368 | 10/1972 | Bhuta et al.................... | 117/76 F X |
| 3,749,756 | 7/1973 | Kosaka et al.................. | 260/878 R |
| 3,838,079 | 9/1974 | Kosaka et al.................. | 260/27 |

FOREIGN PATENTS OR APPLICATIONS
946,384  1/1964  United Kingdom............. 260/878 R

*Primary Examiner*—Ralph Husack
*Attorney, Agent, or Firm*—Oblon, Fisher, Spivak, McClelland & Maier

[57] ABSTRACT

A laminated film which comprises a film substrate, an adhesive undercoat of a carboxylated ethylene copolymer composition prepared by copolymerizing a monomer mixture of an $\alpha,\beta$-unsaturated carboxylic acid or anhydride and at least one vinylidene monomer of the formula $CH_2=CXY$ where X and Y are the same or different and each represents hydrogen, chlorine, a lower alkyl containing 1–6 carbon atoms, acetoxy, or a carboxylic ester group in the presence of an ethylene-vinylacetate copolymer applied to said film substrate, and a top film of a polyolefin or ethylene copolymer applied to said adhesive undercoat.

7 Claims, No Drawings

LAMINATED FILM

BACKGROUND OF THE INVENTION

1. Field of the Invention:

This invention relates to a laminated film which is very effective as a packaging material. More particularly, it relates to a laminated film which is prepared by coating a carboxylated ethylene copolymer on a smooth surface of a substrate such as a biaxially stretched polypropylene film, a polyester film aluminum foil, cellophane, or the like, and then laminating a polyolefin or an ethylene copolymer such as an ethylene-vinylacetate copolymer on the substrate over the coated surface.

2. Description of the Prior Art:

In the past packaging films have been made from one polymer. Recent attempts to improve the moisture proofing properties, the fragrance retaining properties and the heat sealing properties of films have been made by laminating polymers to form laminated sheets such as polymer/different polymer, polymer/paper, polymer/aluminum foil, and the like. These laminated films have been used for automatic packaging. Further, laminated polyethylene has been widely used in the packaging field. However, the lamination of a resin such as polyethylene on a smooth surface of substrate such as polypropylene, cellophane, polyester film or aluminum foil has been difficult, although the lamination of a resin on a fibrous surface such as paper which has rough surfaces is easy.

In order to improve the adhesive properties of various resins, resins such as polyethylene have been extruded at relatively high temperatures or a surface of the substrate has been oxidized or polar groups have been substituted on the surface to improve the adhesive strength of the surface. Alternatively, adhesive accelerators with substantial polarity have been coated on film substrates or the polarity of the surfaces of the substrates have been increased to improve the adhesive properties of the laminated polymer by a corona discharge treatment. Other methods of increasing the adhesiveness of materials have included a potassium bichromate/sulfuric acid treatment, a flame treatment or ultraviolet ray treatment.

Recently, cold foods have attained increased commercialization and the automatic packaging of these foods has been increased. This increase has required laminated films which can be heat-sealed at temperatures lower than that of polyethylene films within a short time and at the same time achieve seals having high strength. One attempt to solve the problem has been the development of a laminated ethylene-vinylacetate copolymer which satisfies these requirements. However, ethylene-vinylacetate copolymers have a lower heat stability than polyethylene. Thus, the conditions under which conventional laminates of polyethylene are treated cannot be used, which places limitations on the heat treatment of ethylenevinylacetate copolymers. The temperatures at which ethylene copolymers are laminated are usually required to be 50° – 100°C lower than the temperatures at which polyethylene is treated. Because of the low lamination temperatures required, proper adhesion of the ethylene copolymer to the substrates has been very difficult. Adhesive accelerators such as organotitanium compounds, organoaluminum compounds and isocyanate compounds have not been able to improve the adhesive properties. In particular, no way has been found to laminate ethylene-vinylacetate copolymers on biaxially stretched polypropylene with high strength.

A need continues to exist, therefore, for a method of improving the adhesive characteristics of laminated polyethylene packaging materials. By the procedure of the invention an adhesive accelerator has been developed which is superior to organotitanium adhesive accelerators for the bonding of polyethylene in laminated films.

SUMMARY OF THE INVENTION

Accordingly, one object of this invention is to provide a high strength laminated film wherein a polyolefin or an ethylene copolymer is laminated on a substrate.

Briefly, this object and other objects of the invention as hereinafter will become more readily apparent can be attained by coating a carboxylataed ethylene copolymer which is prepared by copolymerizing and α,β-unsaturated carboxylic acid and/or anhydride and at least one vinylidene monomer of the formula

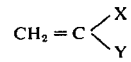

wherein X and Y are the same or different and each represent hydrogen, chlorine, lower alkyl containing 1 – 6 carbon atoms, acetoxy, or carboxylic ester, in the presence of an ethylene-vinylacetate copolymer. The ethylene-vinylacetate copolymer is applied as an adhesive undercoat to a substrate, and then a polyolefin or an ethylene copolymer is laminated to the undercoated surface to prepare a laminated film.

DETAILED DESCRIPTION OF THE PREFERRED EMBODIMENTS

The adhesive accelerator which is used in the laminated film of the invention is a carboxylated ethylene copolymer which is prepared by copolymerizing 1 – 80 parts by weight of a monomeric mixture of an α,β-unsaturated carboxylic acid or anhydride and a vinylidene monomer in the presence of 99 – 20 parts by weight of an ethylene-vinylacetate copolymer having a vinylacetate content of 5 – 70 wt. percent, preferably 10 – 40 wt. percent and a melt index of 0.1 – 500 g/min. at a temperature of from 20°–150°C with a radical initiator. Suitable polymerization techniques for the polymerization reaction include solution, suspension, emulsion, and bulk polymerization. Suitable α,β-unsaturated carboxylic acids or anhydrides include acrylic acid, methacrylic acid, maleic acid, fumaric acid, itaconic acid, maleic anhydride, itaconic anhydride, and the like. Suitable vinylidene monomers include ethylene, propylene, isobutene, butene-1, octene-1, vinylchloride, vinylacetate, lower alkyl esters of acrylic acid or methacrylic acid, and the like.

The carboxylated ethylene copolymer comprises (1) a graft copolymer wherein the α,β-unsaturated carboxylic acid and the vinylidene monomer are grafted onto the ethylene-vinylacetate copolymer and (2) a copolymer produced by copolymerizing the monomers. It is preferable to use a carboxylated ethylene copolymer having a melt index of 0.1 –500 g/10 min. and an acid value of 1 – 250 mg KOH/g which shows the degree of carboxylic acid substituted, in order to accomplish the objectives of the invention. Usually, the ratio of the monomers to the ethylene-vinylacetate copolymer is 1~80 : 99~20 percent by weight, and the ratio of the α,β-unsaturated carboxylic acid or anhydride to said vinylidene monomer is 1:0.1~10. The carboxylated ethylene copolymer adhesive accelerator increases the adhesive properties of the laminate when it is placed between the substrate and the laminated polyolefin or the ethylene copolymer. The undercoating of the adhesive accelerator on the substrate can be accomplished by a solution coating method or a heat melt coating method. When the solution coating method is used, the carboxylated ethylene copolymer is dissolved in a solvent of hexane, heptane, benzene, toluene, xylene, ethyl acetate, ethylenedichloride, propylenedichloride, trichloroethylene, trichloroethane, dioxane, tetrahydrofuran, or the like. A 0.5 – 10 percent, preferably 2 – 5 percent solution is prepared and is coated onto the substrate by a roller coating method as adapted for a direct gravure roll coating method, an offset gravure roll coating method, a dipping method or a bar coating method.

The laminate thickness of the solid components is usually in the range of 0.05 – 1 g/m², preferably 0.15 – 0.25 g/m² which corresponds to a thickness of 0.05 – 1.0μ, preferably 0.15 – 0.25μ. The substrate to which the polyolefin or the ethylene copolymer is laminated include any of the conventional substrates such as aluminum foil, biaxially stretched polypropylene film, unstretched polypropylene film, polyester film, polyamide film, polyethylene film cellophane film, polyvinylchloride film, kraft paper, and the like. The laminated film to which the polyolefin or the ethylene copolymer is laminated with high strength can be obtained by coating the adhesive accelerator of the carboxylated ethylene copolymer on any substrate and then binding the polyolefin or ethylene copolymer film to the substrate. The bonding effects of the adhesive accelerator can be improved by a mechanical treatment of the surface of the substrate by a corona discharge treatment, a flame treatment, an ultraviolet rays treatment, or the like, before the substrate is coated with the adhesive accelerator.

The laminate can be formed by applying the polyolefin such as polyethylene, polypropylene, an ethylene-vinylacetate copolymer, an ethylene-propylene copolymer or the like, to the coated substrate by an extrusion coating method. The laminate can be formed by heat-sealing the polyolefin or the ethylene copolymer film on the surface of the substrate having the adhesive accelerator coating with a hot roller. In order to improve the lamination, it is possible to treat the carboxylated ethylene copolymer coated on the surface of the substrate prior to the lamination with a mechanical treatment such as a corona discharge treatment, a flame treatment, or an ultraviolet ray treatment. Lamination of the ethylene copolymer by extrusion coating is performed at temperatures less than the lamination of polyethylene such as at temperatures of 200°– 250°C. Under low temperature conditions it has normally been difficult to obtain ethylene copolymer laminated films. However, laminated films with high strength and high adhesive strength can be obtained by using a carboxylated ethylene adhesive accelerator.

The carboxylated ethylene copolymer can also be applied as an adhesive accelerator to ethylene copolymers such as, for example, ethylenevinylacetate copolymers (melt index of 1 – 20 g/10 min., preferably 2 – 15 g/10 min.), with a vinylacetate content of 1 – 30 wt. percent, preferably 1 – 20 wt. percent, and also to polyolefins such as, for example, low density polyethylene (melt index 1 – 20 g/10 min., preferably 2 – 9 g/10 min.), high density polyethylene (melt index 1 – 20 g/10 min., preferably 2 – 9 g/10 min.) and polypropylene (melt flow index 1 – 20 g/10 min., preferably 2 – 9 g/10 min.). When polyethylene is laminated with the adhesive accelerator of the invention at relatively low temperatures, laminations with high adhesive strength can be attained. In the preparation of articles such as bags, the heat-sealing properties can be improved, which shows the effectiveness of the adhesive accelerator of the invention.

Having generally described this invention, a further understanding can be obtained by reference to certain specific examples which are provided herein for purposes of illustration only and are not intended to be limiting unless otherwise specified. In the examples, the term "percent" designates percent by weight unless otherwise noted.

EXAMPLE 1

A monomer mixture of vinylchloride, maleic anhydride and acrylic acid was copolymerized in the presence of an ethylene-vinylacetate copolymer (vinylacetate content of 30 wt. percent and a melt index of 30 g/10 min. - ASTM D1238-65T) in order to prepare a carboxylated ethylene copolymer composition having a melt index of 11 g/10 min. and an acid value of 42 mg KOH/g. By this procedure was prepared a composition containing 85 wt. percent of an ethylene-vinylacetate copolymer component and 2 wt. percent of a vinylchloride component. A 5 percent solution of the resulting copolymer composition in toluene was coated on each substrate to a thickness of 3 to 4μ and dried. An ethylenevinylacetate copolymer (vinylacetate content of 10 wt. percent, and a melt index of 9 g/10 min.) was melted and extruded through a T-die at 225°C onto the coated substrate in a thickness of 40μ in order to prepare a laminated film. The adhesive strength of the laminated films were measured by a friction pull test of a test piece 15 mm wide with Schopper's Tension Tester. The results are shown in Table I.

TABLE I (coss head speed 300 mm/min. - distance between chacks 100 mm.)

| Substrate | Undercoat of the carboxylated ethylene copolymer composition | |
|---|---|---|
| | Untreated | Treated |
| Bixially stretched polypropylene film (25μ)* | 10 g/15 mm | 300 g/15 mm |
| Aluminum foil | 60 g/15 mm | 270 g/15 mm |
| Polyester film (25μ) | 5 g/15 mm | 225 g/15 mm |

*The surface of the film was treated with a corona discharge.

The results of the untreated laminated films are shown as reference examples. The results indicate that substantial improvement in the adhesivity of the laminates was achieved with the carboxylated ethylene copolymer adhesive accelerator of the invention.

EXAMPLE 2

A monomer mixture of vinylchloride, maleic anhydride and acrylic acid was copolymerized in the presence of an ethylene-vinylacetate copolymer (vinylacetate content of 30 wt. percent and a melt index of 30 g/10 min.) to prepare a carboxylated ethylene copolymer composition having a melt index of 55 g/10 min. and an acid value of 35 mg KOH/g. By this procedure was prepared a composition containing 86 wt. percent of an ethylene-vinylacetate copolymer component and 3 wt. percent of a vinylchloride component. A 5 percent solution of the resulting copolymer composition in a 1:1 toluene-trichloroethane solution was coated on a biaxially stretched polypropylene film. A laminated product was prepared by bonding the ethylene-vinylacetate copolymer to a polypropylene substrate by the procedure of Example 1. The adhesive strength of the laminated film as measured by a friction pull test was 280 g/15 min.

EXAMPLE 3

A monomer mixture of propylene and maleic anhydride was copolymerized in the presence of an ethylene-vinylacetate copolymer (vinylacetate of 26 wt. percent and a melt index of 8 g/10 min.) to prepare a carboxylated ethylene copolymer composition having a melt index of 4 g/10 min. and an acid value of 28 mg KOH/g. By this procedure was prepared a composition containing 93 wt. percent of an ethylene-vinylacetate copolymer component. A 5 percent solution of the resulting copolymer composition in toluene was coated on a biaxially stretched polypropylene film. To the coated film was bonded an ethylene-vinylacetate copolymer to prepare a laminated film in accordance with the procedure of Example 1. The adhesive strength of the laminated film as measured by a friction pull test was 430 g/15 min. When aluminum foil was used as the substrate, the adhesive strength of the laminated film was 600 g/15 mm.

EXAMPLE 4

A 5 percent solution of the carboxylated ethylene copolymer composition of Example 1 in a 1:1 toluene - 1,1,1-trichloroethane solution was coated on each of the substrates shown in Table II to a thickness of 3 – 4μ. An ethylene-vinylacetate copolymer (vinylacetate content of 16 wt. percent and a melt index of 7.5 g/10 min.) was melted and extruded through a T-die at 240°C. The extruded polymer was bonded to the coated substrates at a thickness of 40μ to prepared a series of laminated films. Also, polyethylene (density of 0.917 g/cc and a melt index of 8 g/10 min.) was melted and extruded through the T-die at 310°C. The extruded polyethylene polymer was bonded to the coated substrate at a thickness of 20μ or 40μ to prepare several laminated films. The adhesive strength of the laminated films was measured and compared as shown in Table II.

TABLE II

| Substrate | EVA (40μ) | Laminated Resin Polyethylene | |
|---|---|---|---|
| | | (20μ) | (40μ) |
| Cellophane (PT-300) printed surface | 395 g/15 mm | 295 g/15 mm | 450 g/15 mm |
| Non-printed surface | 385 g/15 mm | 345 g/15 mm | 495 g/15 mm |
| Biaxially stretched polypropylene film (22μ) | 260 g/15 mm | 190 g/15 mm | 295 g/15 mm |
| Aluminum foil (9μ) | 400 g/15 mm | 480 g/15 mm | 600 g/15 mm |

EVA:ethylene-vinylacetate copolymer

EXAMPLE 5

A monomer mixture of ethylacrylate and maleic anhydride was copolymerized in the presence of an ethylene-vinylacetate copolymer (vinylacetate content of 36 wt. percent and a melt index of 30 g/10 min.) to prepare a carboxylated ethylene copolymer composition having a melt index of 15 g/10 min. and an acid value of 20 mgKOH/g. By this procedure was prepared a composition containing 65 wt. percent of the ethylene-vinylacetate copolymer component. A 5 percent solution of the resulting copolymer composition in toluene was coated on the substrates shown in Table III to a thickness of 3 – 5μ, and dried. An ethylene-vinylacetate copolymer (vinylacetate content 6 wt. percent and a melt index of 8 g/10 min.) was melted and extruded through a T-die at 270°C. The extruded polymer was bonded to the coated substrates at a thickness of 20μ to prepare a laminated film. Also, polyethylene (density of 0.917) was melted and extruded through a T-die at 315°C onto several coated substrates at a thickness of 20μ to 40μ to prepare a series of laminated films. The adhesive strengths of the laminated films were measured and compared as shown in Table III.

TABLE III

| Substrate | EVA copolymer (40μ) | Laminated Resin Polyethylene | |
|---|---|---|---|
| | | (20μ) | (40μ) |
| Cellophane (PT-300) printed surface | 200 g/15 mm | 250 g/15 mm | 430 g/15 mm |
| non-printed surface | 215 g/15 mm | 260 g/15 mm | 410 g/15 mm |
| Biaxially stretched polypropylene film (25μ) | 150 g/15 mm | 180 g/15 mm | 300 g/15 mm |
| Aluminum foil (9μ) | 305 g/15 mm | 450 g/15 mm | 490 g/15 mm |

Having now fully described this invention, it will be apparent to one of ordinary skill in the art that many changes and modifications can be made thereto without departing from the spirit or scope of the invention as set forth herein.

What is claimed as new and intended to be covered by letters patent is

1. A laminated film which comprises:
a film substrate wherein said film substrate is aluminum foil, biaxially stretched polypropylene film, unstretched polypropylene film, polyester film, polyamide film, polyethylene film, cellophane, polyvinylchloride or kraft paper and wherein said top film is polyethylene, polypropylene, an ethylene-vinylacetate copolymer or an ethylenepropylene copolymer; an adhesive undercoat of a carboxylated ethylene copolymer composition prepared by copolymerizing a monomer mixture of an α,β-unsaturated carboxylic acid or anhydride and at least one vinylidene monomer of the formula

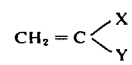

wherein X and Y are the same or different and each represents hydrogen, chlorine, a lower alkyl group containing 1 – 6 carbon atoms, acetoxy, or a carboxylic ester group in the presence of an ethylene-vinylacetate copolymer, wherein the ratio of said monomer mixture to said ethylenevinylacetate copolymer is 1~80 : 99~20 parts by weight and the ratio of said α,β-unsaturated carboxylic acid or anhydride to said vinylidene monomer is 1 : 0.1~10, wherein said ethylenevinylacetate copolymer contains 5-70 wt percent of a vinylacetate component and has a melt index of 0.1 – 500 g/10 min, applied to said film substrate; and a top film of a polyolefin or ethylene copolymer applied to said adhesive undercoat.

2. The laminated film of claim 1, wherein said α,β-unsaturated carboxylic acid or anhydride is acrylic, methacrylic, maleic, fumaric, itaconic acid or anhydride and said vinylidene monomer is ethylene, propylene, isobutene, butene-1, octene-1, vinylchloride, vinylacetate, lower alkylesters of acrylic acid or methacrylic acid.

3. The laminated film of claim 1, wherein said carboxylated ethylene copolymer composition is applied as an undercoat on said film substrate as a solution prepared by dissolving said carboxylated ethylene copolymer composition in a solvent of hexane, heptane, benzene, toluene, xylene, ethyl acetate, ethylenedichloride, propylenedichloride, trichloroethylene, trichloroethane, dioxane or tetrahydrofuran.

4. The laminated film of claim 1, wherein said film substrate is aluminum foil.

5. The laminated film of claim 1, wherein said film substrate is biaxially stretched polypropylene film, unstretched polypropylene film or polyethylene film, and wherein said top film is polyethylene film, polypropylene film or an ethylene-propylene copolymer film.

6. The laminated film of claim 1, wherein said film substrate is polyester film, polyamide film, cellophane, polyvinylchloride or kraft paper.

7. The laminated film of claim 1, wherein said top film is an ethylene vinylacetate copolymer.

* * * * *